Feb. 12, 1952     G. S. PRATHER     2,585,170
CONTINUOUS PRESSURE COOKER
Filed Dec. 5, 1947                                3 Sheets-Sheet 1
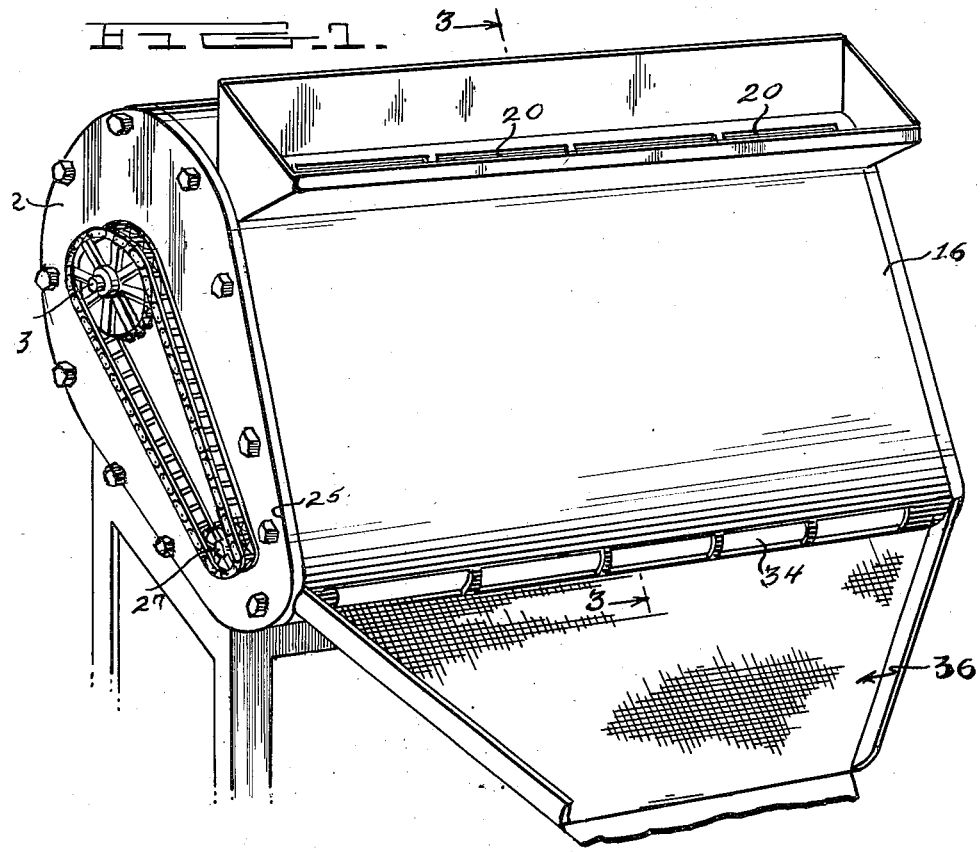
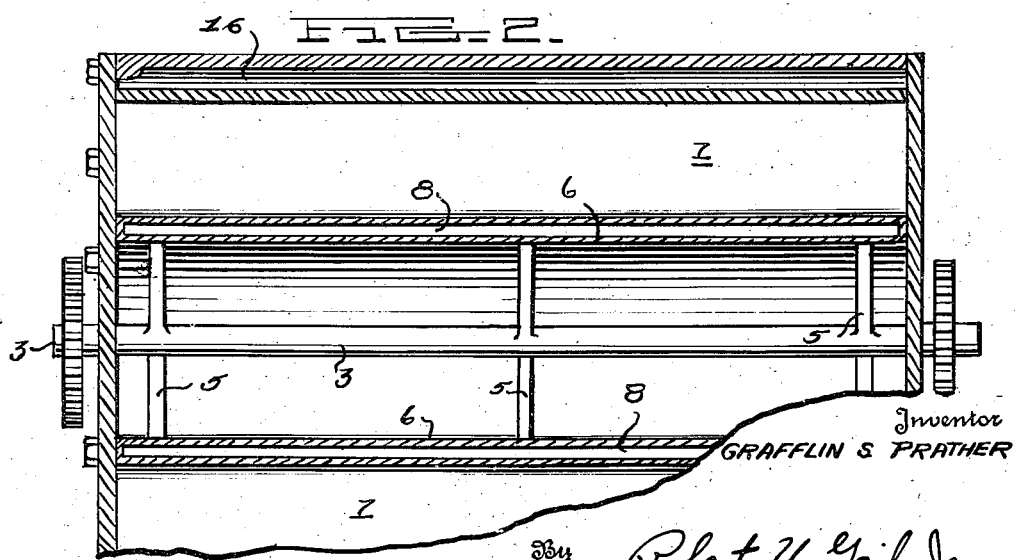
Inventor
GRAFFLIN S. PRATHER
By Robert U. Geib, Jr.
ATTORNEY

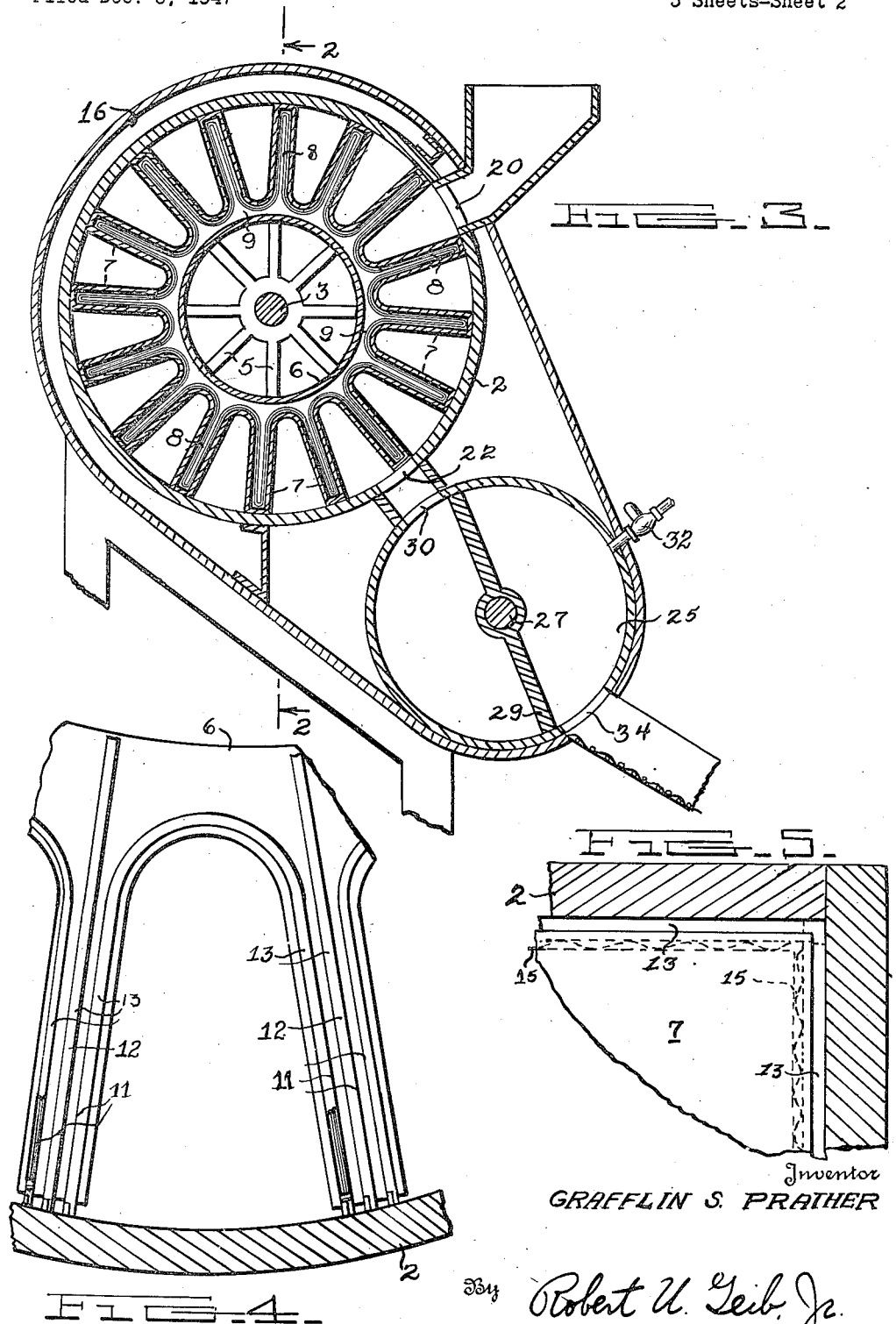

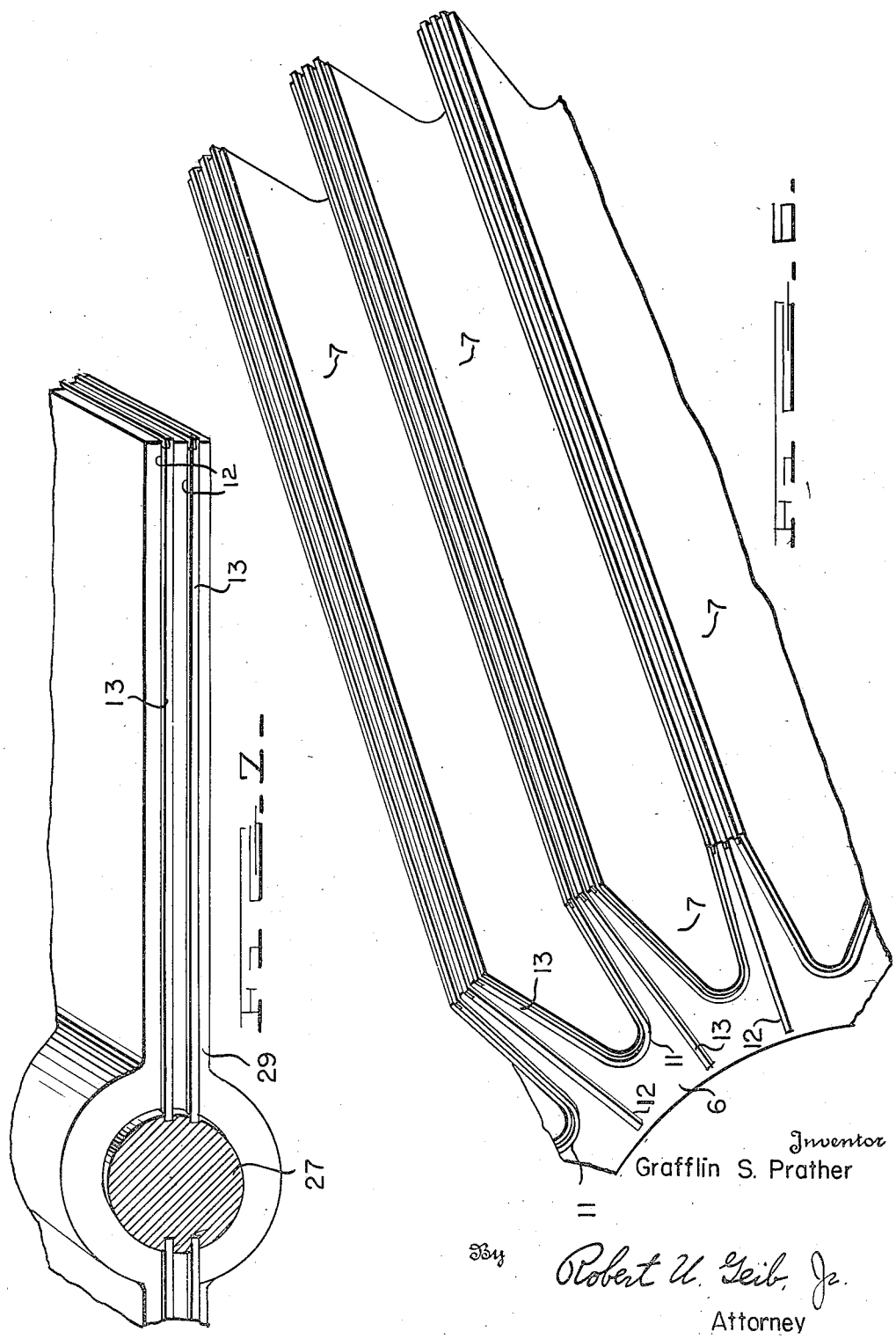

Patented Feb. 12, 1952

2,585,170

UNITED STATES PATENT OFFICE 2,585,170

CONTINUOUS PRESSURE COOKER

Grafflin S. Prather, New York, N. Y.

Application December 5, 1947, Serial No. 789,932

2 Claims. (Cl. 99—443)

This invention relates to pressure cookers and, more particularly, to a pressure cooker which is operable over a very wide range of temperatures and one which is at the same time continuous in operation.

Ordinarily, a pressure cooker, whether of commercial adaptation or otherwise, utilizes a relatively low pressure, for example, forty pounds or less. In commercial operations, such as in the canning industry, it is necessary for economic considerations that the cooking operation be accomplished as rapidly as possible. Accordingly, it has become the practice to move the material being cooked through the cooking chamber by means of a continuously operating conveyor, such as an endless belt, screw-conveyor or the like. Sometimes, the material to be cooked is introduced to, and removed from, the cooking chamber by means of feeding devices which operate intermittently.

It is among the objects of the present invention to provide a new and useful pressure cooker which may be utilized at temperatures extending over a wide range and which operates to move the material to be cooked through the cooking chamber in a speedy and efficient manner.

Another object is the provision of a cooker possessing the foregoing advantages and one which is further characterized by continuous movement of the material to be cooked not only through the cooking chamber itself, but also into and out of the said cooking chamber.

Still another object is to provide a pressure cooker which is capable of operation over a very wide range of temperatures and completely through which the material to be fed is not only continuous, but may, if desired, be entirely constant.

A further object is the provision of a comparatively simple and inexpensive apparatus which may be efficiently operated to accomplish the foregoing ends.

The invention, then comprises the features hereinafter fully described and as particularly pointed out in the claims, the following description and the annexed drawings setting forth in detail certain illustrative embodiments of the invention, these being indicative of several of the number of ways in which the principles of the invention may be employed.

In said drawings:

Figure 1 is a perspective of the apparatus of the present invention;

Figure 2 is a longitudinal section on the line 2—2 of Figure 3;

Figure 3 is a transverse sectional elevation taken on the line 3—3 of Figure 4;

Figure 4 is a fragmentary side elevation showing the sealing rings which form a part of the apparatus;

Figure 5 is a fragmentary front elevation further showing the sealing rings of Figure 4; and Figure 6 is an enlarged fragmentary perspective of the rotatable member which forms the series of individual cooking compartments;

Figure 7 is an enlarged fragmentary perspective illustrating the rotatable member within the cylindrical expansion chamber which is associated with the continuous pressure cooker.

Referring more particularly to the drawings, the numeral 2 designates a suitably supported horizontally disposed cylindrical drum having a highly finished bore. Along the axis of the bore of the cylindrical drum 2, there extends a shaft 3 which projects from either end of said drum and is rotatably supported in any suitable manner as by means of antifriction bearings 4. The shaft 3 is power-driven in any suitable manner. At either end of the cylindrical drum 2 and at the appropriate transverse center thereof, the shaft 3 carries a series of radial spokes 5. These three sets of spokes 5 carry an annular member 6 which extends substantially throughout the length of the cylindrical drum 2 and is provided along its peripheral portion with a series of radial extensions 7, the outer ends of which terminate in close adjacency with respect to the bore of the cylindrical drum to provide a series of compartments, the purpose of which will be later described.

As shown in Fig. 2 of the drawings, the radial extensions 7 are hollow, as at 8, and communicate with each other through curved passageways 9 which are formed in the adjacent portions of the annular member 6. The hollow portions 8 of the radial extensions 7 and the communicating curved passageways 9 of the annular member 6 are adapted to receive heat which may be introduced thereto electrically, by suitable fuel burners, steam, etc. In Figure 3 of the drawings, the interiors of the hollow portions 8 of the radial extensions 7, and the communicating curved passageways 9 are shown as provided with conventional electrical resistance heating elements which receive electrical energy through conventional collector-ring-and-brush assemblies (not shown).

Referring more particularly to Fig. 6, the radial extensions 7 on the annular member 6 may extend along a line which is parallel with the shaft 3 or may, for purposes which will appear hereinafter, be somewhat inclined with respect to the shaft 3 so as to produce a helical line with respect to the bore of the cylindrical drum 2. In either case, the ends of the radial extensions 7, which are adjacent to the ends of the cylindrical drum, are substantially flat occupying planes at right angles to the axis of the drum; and in either case, each of the radial extensions 7 is continually channelled longitudinally and down both ends thereof to communicate with a similar channel formed on the next adjacent radial extension as shown at 11, thus requiring a pair of grooves running throughout the length and down the ends of each of the radial extensions 7. In addition, each of the radial extensions has an intermediately disposed groove 1, which extends from the annular member 6 outwardly along the end of each radial extension and lengthwise thereof. Within each of the continuous grooves 11, and within each of the discontinuous intermediately disposed grooves 12, there is disposed a pair of metallic seals 13 which are similar in operation to a piston ring and therefore capable of withstanding extreme pressures. These metallic seals 13 may be manufactured and installed in suitable sections which may be joined in stepped relationship as in the manner of piston rings, etc.

All of the metallic seals 13 are urged outwardly out of their respective slots and into contact with the bore of the cylindrical drum 2 by means of spring strips 15 which lie at the bottoms of the grooves in which the metallic seals 13 are fitted. These spring strips 15 may be undulating, or otherwise suitably shaped, in the manner of piston ring expanders and may be utilized in any number found convenient; for example, a single spring strip 15 may be utilized in such width as to outwardly urge both of the rings fitted within the groove in which it is disposed.

According to the foregoing construction and arrangement, there is provided between the radial extensions 7 a series of compartments (shown in Fig. 2 as being sixteen in number) which are capable of retaining extremely high fluid pressures which may be induced by heat applied through the hollow portions 8 and curved passageways 9 in the radial extensions 7, and annular member 6 respectively. In addition, there is disposed to extend around a substantial portion of the periphery of the cylindrical drum 2 a heating chamber 16 into which heat may be induced electrically, by fuel burners, steam, etc. In Figure 3, the heating chamber 16 is shown as provided with conventional electrical resistance heating elements 10 in the manner of the aforementioned hollow portions 8 of the radial extensions 7 and their communicating curved passageways 9. As shown in Fig. 2, the heating chamber 16 may extend peripherally from adjacent to the top of the cylindrical drum 2 in a counter-clockwise direction for approximately 180°.

Referring to Fig. 3, the cylindrical drum 2 is provided at a point approximately 45° (in a clockwise direction) from the top thereof with a series of apertures 20 which extend longitudinally throughout substantially the entire length of the cylindrical drum 2 and are suitably spaced from one another. These apertures 20 constitute the intake orifices of the pressure cooker of the present invention; and the discharge orifices are comprised of a series of apertures 22 which are similar in shape and disposition to the apertures 20, but which are spaced from the latter at an angle of approximately 90° (again in a clockwise direction with respect to the view shown in Fig. 2). When the shaft 3 is rotated in a counter-clockwise direction, when viewed as in Fig. 2, it will be seen that, as the radial extensions 7 on the annular member 6 are moved into registration with the apertures 20 in the cylindrical drum 2, material to be cooked may be introduced into each of the compartments formed between successive pairs of radial extensions and moved in a counter-clockwise direction downwardly until they align with the apertures 22 through which the material is discharged.

Among the features of the present invention is the provision of an expansion chamber 25 which communicates with the apertures 22 in such manner as to receive the cooked material despite the high pressure maintained within the individual compartments. To this end, there is provided an expansion chamber 25 which is in the form of a cylindrical drum in the manner of the cylindrical drum 2 and, like the latter, provided with a highly finished bore. Disposed to extend through the axis of the cylindrical expansion chamber 25 is a shaft 27 which projects therefrom at either end and suitably supported through antifriction bearings 28. The shaft 27 carries a rotatable blade 29 which extends substantially throughout the length of the expansion chamber 25 and into close adjacency with respect to the bore of the latter. The longitudinal and side edges of the rotatable blade 29 are provided with grooves and metallic seals in the manner of the intermediate grooves and metallic seals 13 as described in connection with the radial extensions 7.

In the immediately foregoing manner, the expansion chamber 25 is divided by the rotatable blade 29 into two compartments, the size of each of which is approximately eight times the size of each of the compartments defined between adjacent pairs of radial extensions 7. The expansion chamber 25 is provided with a series of longitudinal suitably spaced apertures 30 which extend longitudinally substantially throughout its length and which register with the apertures 22 in the cylindrical drum 2. In addition, the upper portion of the expansion chamber 25 is provided with a release valve 32 which vents into the atmosphere. The lower portion of the expansion chamber 25 is provided with a series of slots 34 which extend longitudinally substantially throughout its length and through which the cooked material is finally discharged over screens, which are generally indicated at 36.

The ends of the shafts 3 and 27 are interconnected in any suitable manner, as through the sprocket and chain illustrated in Fig. 1 so as to permit the shaft 27 to be driven at eight times the speed of the shaft 3. Such construction and arrangement will enable each of the compartments confined by adjacent pairs of radial extensions 7 to communicate with one side or other of the rotatable blade 29 which, at that moment, will provide an area of substantially 8 to 1 into which the high pressure is dissipated through the apertures 30 which form the intake of the expansion chamber 26.

If the outer edges of each of the radial extensions 7 is made to extend in a straight line with respect to the axis of the shaft 3, the cooking compartments, as they successively register with the expansion chamber 25, will provide a continuous discharge of cooked material into the latter interrupted only by the width of the outer edge of each of the radial extensions 7 as it registers with the apertures 22. However, the axial inclination of each of the radial extensions 7 (to provide the helical effect with respect to the bore of the cylindrical drum 2) will enable a discharge from the cooking chamber defined by the cylindrical drum 2 into the expansion chamber 25 in a manner which is not only continuous, but is constant. In either case, the sealing of the individual compartments of the cooking chamber and the sealing of the rotatable blade 29 of the expansion chamber, when combined with the driving arrangement hereinbefore described, enables the rapid processing of the material to be cooked at very high pressures.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. A continuous pressure cooker comprising a horizontally disposed drum having a cylindrical bore, closure members for the ends of said drum, a rotatable shaft extending axially through and projecting from said drum, a series of radial members carried by said shaft and extending into proximity with respect to the bore of said drum and with respect to the inner faces of said closure members, means for pressure sealing the longitudinal and side edges of each of said radial members against the bore of said drum and the inner faces of said closure members respectively, said drum having an opening through which the material to be cooked may be introduced, a second horizontally disposed drum having a cylindrical bore, closure members for the ends of said last-named drum, a rotatable shaft extending axially through and projecting from said last-named drum, a blade-like member carried by said last-named shaft and extending into proximity with respect to the bore of said last-named drum and with respect to the inner faces of the closure members therefor, and means for pressure sealing the longitudinal and side edges of said blade-like member against the bore of said last-named drum and the inner faces of its closure members, respectively, said last-named drum having an inlet opening in communication with said first-named drum and a discharge opening remotely disposed with respect thereto, said first-named shaft and said last-named shaft being connected for conjoint rotation.

2. A continuous pressure cooker comprising a horizontally disposed drum having a cylindrical bore, closure members for the ends of said drum, a rotatable shaft extending axially through and projecting from said drum, a series of radial members carried by said shaft and extending into proximity with respect to the bore of said drum and with respect to the inner faces of said closure members, means for pressure sealing the longitudinal and side edges of each of said radial members against the bore of said drum and the inner faces of said closure members respectively, said drum having an opening through which the material to be cooked may be introduced, a second horizontally disposed drum having a cylindrical bore, closure members for the ends of said last-named drum, a rotatable shaft extending axially through and projecting from said last-named drum, a blade-like member carried by said last-named shaft and extending into proximity with respect to the bore of said last-named drum and with respect to the inner faces of the closure members therefor, means for pressure sealing the longitudinal and side edges of said blade-like member against the bore of said last-named drum and the inner faces of its closure members, respectively, said last-named drum having an inlet opening in communication with said first-named drum and a discharge opening remotely disposed with respect thereto, said first-named shaft and said last-named shaft being connected for conjoint rotation, and a release valve for that portion of said last-named drum which is in communication with said first-named drum.

GRAFFLIN S. PRATHER.

REFERENCES CITED

The following references are of record in the file of this patent:

UNITED STATES PATENTS

| Number | Name | Date |
|---|---|---|
| 1,227,002 | Rhoades | May 22, 1917 |
| 1,303,864 | Davis | May 20, 1919 |
| 1,969,717 | Bach | Aug. 14, 1934 |
| 2,343,266 | Richmond | Mar. 7, 1944 |
| 2,490,112 | Winters | Dec. 6, 1949 |